(No Model.)
T. WAGNER.
Iron Corner Monument.
No. 239,283. Patented March 22, 1881.
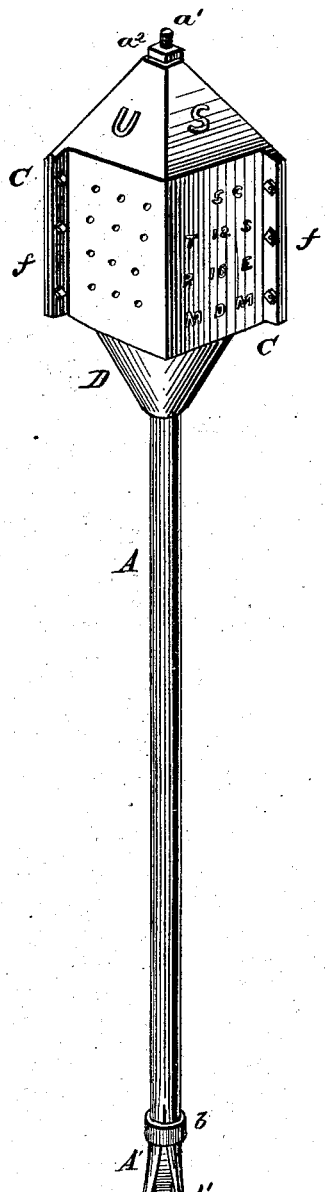
Fig. 1.
Fig. 4.
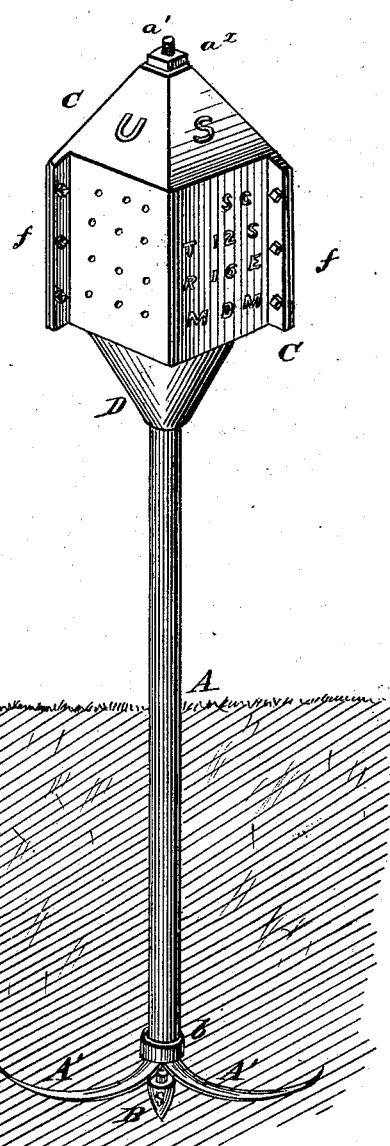
Fig. 2.
Fig. 3.
Fig. 5.
Witnesses:
Inventor:
Theodore Wagner
by Louis Bagger
Attorneys
N. PETERS, PHOTO-LITHOGRAPHER, WASHINGTON, D. C.

UNITED STATES PATENT OFFICE.

THEODORE WAGNER, OF SAN FRANCISCO, CALIFORNIA.

IRON CORNER-MONUMENT.

SPECIFICATION forming part of Letters Patent No. 239,283, dated March 22, 1881.

Application filed February 23, 1881. (No model.)

*To all whom it may concern:*

Be it known that I, THEODORE WAGNER, a citizen of the United States, residing at San Francisco, in the county of San Francisco and State of California, have invented certain new and useful Improvements in Iron Corner-Monuments; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved iron corner-monument. Fig. 2 is a similar view, showing the stake driven into the ground. Fig. 3 is a perspective view of the plug at lower end of stake. Fig. 4 is a side view of the stake, and Fig. 5 is a perspective view of the detachable cap-support.

Similar letters of reference indicate corresponding parts in all the figures.

This invention has relation to corner-monuments, or stakes for marking, in a permanent and conspicuous manner, the corners of townships, &c.; and it consists in an improved construction of the same, having for its object to facilitate transportation of the monument over difficult roads, and also to increase its durability and permanency.

In the annexed drawings, A represents a stake, which is a little over six feet in length, more or less, and which consists of an upper solid part, about one and one-fourth inch in diameter, and a lower tubular part which is composed of three downward-projecting arms or fingers, A', welded to the end of the solid part of the stake, and made with tapering ends turned slightly outward at their points, as shown at *a*. *b* is a sleeve or ring, which is slipped over this part of the stake, and is prevented from sliding off by the hooked or bent points *a*. The top of the stake has a screw-threaded tenon, *a'*, to receive a nut for holding the cap in place.

Before proceeding to describe the construction of the cap and its support, I shall describe the method of planting the stake in the ground at the point or corner to be marked. This is done in the following manner: A plug of cast-iron, (shown at B,) about one and three-fourths of an inch wide, and weighing from four to five pounds, is inserted into the lower open end of a stout tube of suitable length, the upper end of which is preferably solid. As will be seen by reference to the drawings, the plug B has a shank, *c*, a narrow annular shoulder, *d*, encircling the shank, and a conical body, B, tapering to a point, *e*. The shank *c* fits into the lower end of the tube referred to, which rests upon the shoulder *d*, and is of a diameter equal to that of the widest part of the plug, so as not to project beyond its sides. The plug, with its tube or handle, is now placed over the exact spot where the monument is to be erected, and is driven down into the ground to the depth of about two feet by striking the head of the tube or handle with a mallet. The tube is then withdrawn, and the stake A A' is inserted into the hole made by it, a cap placed over its top *a'*, and the cap struck with a mallet, which drives the stake down upon the plug, spreading its lower forked end A' out laterally, as shown in Fig. 2, the ring *b* being forced up to the lower end of the solid part A. This effectually prevents withdrawal or displacement of the stake and saves the time and labor incident to the boring of a hole for planting it. The plug B is marked on its sides with suitable marks or letters to identify it, if, purposely or otherwise, the stake and monument should be removed or destroyed.

C is the cap or monument proper, which is of substantially the same construction and pattern as shown in another application—that is, it consists of two hollow parts or sections, which are bolted together by their side flanges, *f*, so as to constitute a lower square part and a pyramidal top or apex, as shown in the drawings. The sides or faces of the lower square part are perforated to receive detachable letters and figures of cast metal, the shanks of which are inserted through the perforations and nutted on the inside before the two parts of the cap are put together, the inner ends of the letter shanks or bolts being hammered down upon the nuts to prevent them from working loose. This cap is about one foot from base to point, of cast-iron, and suitably painted, for the double purpose of making it as conspicuous as possible and protecting it against rust. The cap, or monument proper, has a hole in its top and bottom for inserting it upon the stake A, upon which it is held by a cup-shaped or tapering tubular casting, D, the lower end of which is slotted transversely on the inside to receive the lugs or key $g$ of the stake, which said lugs are concealed within the casting when this is in its proper position upon the stake, and serve the double purpose of holding part D in place and preventing it from turning. The top of the casting D has radial ribs $h$, (preferably eight in number,) which fit into corresponding radial slots in the bottom or base of the cap C, which, after having been inserted upon the stake and properly fitted upon its support D, is held in place by the nut $a^2$ on the top of the stake. After the stake has been planted in the ground and the cap properly placed and fastened, a mound is formed by piling dirt and rocks around the projecting end of the stake underneath the cap, and the monument is complete.

Having thus described my invention, I claim and desire to secure by Letters Patent of the United States—

1. The combination of the marked plug B and stake A, having tapering and pointed prongs or fingers A' at its lower end and provided with the sleeve or ring $b$, substantially as set forth.

2. The combination of the stake A, having key $g$, cup-shaped tubular casting D, slotted to receive said key and provided with radial ribs $h$ on its top or face, hollow cap C, having radial slots in its bottom coinciding with the radiating ribs $h$ of the casting or support D, and nut $a^2$, substantially as and for the purpose herein shown and set forth.

3. The iron corner-monument composed of the marked plug B, stake A' A, having ring $b$ and key $g$, cap-support D, slotted at its lower end, inside, to receive said key, and provided with the radial ribs $h$, cap C, and nut $a^2$, the whole constructed, combined, and arranged substantially in the manner and for the purpose herein shown and specified.

In testimony that I claim the foregoing as my own I have hereunto affixed my signature in presence of two witnesses.

THEODORE WAGNER.

Witnesses:
AUGUST PETERSON,
JOHN T. ARMS.